(12) United States Patent
Oh et al.

(10) Patent No.: US 9,790,356 B2
(45) Date of Patent: Oct. 17, 2017

(54) METHOD OF PREPARING THERMOPLASTIC RESIN

(71) Applicant: LG CHEM, LTD., Seoul (KR)

(72) Inventors: Hyun Taek Oh, Daejeon (KR); Jeong Su Choi, Daejeon (KR); Keun Hoon Yoo, Daejeon (KR); Bong Keun Ahn, Daejeon (KR); Won Seok Lee, Daejeon (KR); Seok Goo Jang, Daejeon (KR); Roo Da Lee, Daejeon (KR); Sang Hoo Park, Daejeon (KR); Ho Hoon Kim, Daejeon (KR); Hyung Seop Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/038,402

(22) PCT Filed: Oct. 8, 2015

(86) PCT No.: PCT/KR2015/010637
§ 371 (c)(1),
(2) Date: May 20, 2016

(87) PCT Pub. No.: WO2016/089000
PCT Pub. Date: Jun. 9, 2016

(65) Prior Publication Data
US 2016/0326362 A1 Nov. 10, 2016

(30) Foreign Application Priority Data

Dec. 5, 2014 (KR) .................. 10-2014-0173861
Oct. 1, 2015 (KR) .................. 10-2015-0138309

(51) Int. Cl.
| | | |
|---|---|---|
| C08L 51/04 | (2006.01) | |
| C08L 25/12 | (2006.01) | |
| C08F 6/22 | (2006.01) | |
| C08F 279/04 | (2006.01) | |
| C08F 2/38 | (2006.01) | |

(52) U.S. Cl.
CPC .............. *C08L 25/12* (2013.01); *C08F 6/22* (2013.01); *C08F 279/04* (2013.01); *C08F 2/38* (2013.01); *C08L 2205/03* (2013.01); *C08L 2207/04* (2013.01)

(58) Field of Classification Search
CPC ...... C08F 279/04; C08F 6/22; C08F 2205/03; C08L 25/12; C08L 51/04; C08L 55/02; C08L 39/00; C08L 5/08; C08L 6/22; C08L 2207/04; C08L 2205/03
See application file for complete search history.

(56) References Cited

U.S. PATENT DOCUMENTS

| | | | | |
|---|---|---|---|---|
| 3,954,913 A * | 5/1976 | Uebele | .................. | C08F 279/02 524/109 |
| 4,287,312 A * | 9/1981 | Yusa | ..................... | C08F 279/02 525/261 |
| 5,196,480 A * | 3/1993 | Seitz | ....................... | C08L 25/12 525/71 |
| 2005/0154361 A1* | 7/2005 | Sabesan | ................. | A01N 43/16 604/365 |
| 2008/0249214 A1* | 10/2008 | Wegmann | ............. | C08F 257/02 524/101 |
| 2010/0016456 A1* | 1/2010 | Cruz | ......................... | C08F 6/22 521/40 |

FOREIGN PATENT DOCUMENTS

| | | |
|---|---|---|
| JP | 11-138702 A | 5/1999 |
| KR | 10-2004-0069181 A | 8/2004 |
| KR | 10-2006-0076792 A | 7/2006 |
| KR | 10-2006-0117668 A | 11/2006 |
| KR | 10-2007-0027776 A | 3/2007 |
| KR | 10-2009-0087109 A | 8/2009 |
| KR | 10-2012-0071941 A | 7/2012 |

OTHER PUBLICATIONS

International Search Report for International Patent Application No. PCT/KR2015/010637 dated Oct. 8, 2015.

* cited by examiner

*Primary Examiner* — Jeffrey Mullis

(57) ABSTRACT

The present invention relates to a method of preparing a thermoplastic resin. In accordance with the present invention, provided is a thermoplastic resin having superior antibiosis and melt-kneadability prepared through preparation of a graft copolymer latex and coagulation of the graft copolymer latex with a specific antimicrobial agent, and a method of preparing the thermoplastic resin to prepare a thermoplastic resin composition including the thermoplastic resin.

11 Claims, No Drawings

METHOD OF PREPARING THERMOPLASTIC RESIN

CROSS-REFERENCE TO RELATED APPLICATIONS

This application is a U.S. National Stage of PCT/KR2015/010637, filed Oct. 8, 2015, which claims the benefit of Korean Patent Application No. 10-2014-0173861 filed on 5 Dec. 2014 and Korean Patent Application No. 10-2015-0138309 filed on 1 Oct. 2015 with the Korean Intellectual Property Office, the disclosures of which are incorporated herein by reference in their entirety.

TECHNICAL FIELD

The present invention relates to a method of preparing a thermoplastic resin. More particularly, the present invention relates to a thermoplastic resin having superior antibiosis and melt-kneadability prepared through preparation of a graft copolymer latex and coagulation of the graft copolymer latex with a specific antimicrobial agent, and a method of preparing the thermoplastic resin to prepare a thermoplastic resin composition including the thermoplastic resin.

BACKGROUND ART

Acrylonitrile-butadiene-styrene (hereinafter referred to as ABS) resin has superior properties such as superior impact resistance, chemical resistance, processability and surface gloss, thus being broadly used in office machines, electrical and electronic products, automobile interior materials, toys, miscellaneous goods, and the like.

Recently, as interest on hygiene is increasing, research into ABS resin having antibacterial characteristics to inhibit bacterial contamination and bacteria proliferation due to contact is actively underway. Accordingly, various methods to provide antibacterial characteristics are suggested. As a most general method, there is a method of adding an antimicrobial agent to a resin. Used antimicrobial agents may be greatly classified into an organic antimicrobial agent and an inorganic antimicrobial agent.

An inorganic antimicrobial agent is generally prepared by substituting an inorganic substance such as zeolite, calcium phosphate, zirconium phosphate, or silica gel with metallic ions having anti-bacterial function such as silver, zinc, or copper. Such an inorganic antimicrobial agent is currently utilized in various fields such as plastic products, paper, or textile. However, so as to provide generally satisfied antibacterial characteristics through addition of the inorganic antimicrobial agent, the inorganic antimicrobial agent should be added in a large amount. In this case, the large amount of the antimicrobial agent may cause discoloration and property deterioration of a resin, and production costs increase.

For example, Korean Patent Laid-Open Publication No. 2006-0076792 suggests a method of providing antibacterial characteristics by adding silver nanoparticles, as an inorganic antimicrobial agent, to an ABS-based transparent resin. However, production costs greatly increase due to expensive silver nanoparticles. In addition, toxicity to the human body of the metal ions is being recently reported, and thus, attempts to limit use thereof have been continuously made.

An organic antimicrobial agent may be re-classified into a unimolecular antimicrobial agent having a small molecular weight and a polymeric antimicrobial agent. The unimolecular organic antimicrobial agent having a small molecular weight has superior short-term antibacterial characteristics, but persistence of antimicrobial activity thereof is very poor. In addition, use of the unimolecular organic antimicrobial agent is limited due to acute toxicity to the human body. On the other hand, the polymeric antimicrobial agent has advantages such as increased antibacterial activity, reduced toxicity to the human body, and extended persistence of antimicrobial activity, compared to an existing unimolecular antimicrobial agent having a small molecular weight. However, such a polymeric antimicrobial agent also has poor melt-kneadability to a resin, particularly an ABS-based thermoplastic resin. Accordingly, when the polymeric antimicrobial agent is melt-kneaded with the ABS-based thermoplastic resin by means of an extruder, or the like to prepare an antibiotic ABS-based thermoplastic resin, mechanical properties of a prepared thermoplastic resin are greatly decreased.

Therefore, so as to address the aforementioned problems, there is a need for research into ABS-based thermoplastic resin having superior antibacterial characteristics without decrease of mechanical properties due to a polymeric antimicrobial agent uniformly dispersed in a thermoplastic resin.

RELATED ART DOCUMENT

Patent Document (Patent Document 1) KR2006-0076792 A

DISCLOSURE

Technical Problem

Therefore, the present invention has been made in view of the above problems, and it is one object of the present invention to provide a method or preparing a thermoplastic resin having superior antibiosis and melt-kneadability prepared through preparation of a graft copolymer latex and coagulation of the graft copolymer latex with a specific antimicrobial agent.

It is another object of the present invention to provide a method of preparing a thermoplastic resin composition having excellent mechanical properties, fluidity, and antibiosis due to inclusion of the thermoplastic resin.

It is yet another object of the present invention to provide a thermoplastic resin including the antimicrobial agent and a thermoplastic resin composition including the same.

The above and other objects can be accomplished by the present invention described below.

Technical Solution

In accordance with one aspect of the present invention, provided is a method of preparing a thermoplastic resin, the method including: i) a step of preparing a graft copolymer latex by graft-polymerizing a) a conjugated diene rubber with b) at least one selected from the group consisting of an aromatic vinyl compound, a vinyl cyan compound, and an acrylate-based compound; and ii) a step of performing coagulation by adding a antimicrobial agent polymer having a primary, secondary, tertiary, or quaternary amine group to the graft copolymer latex.

In accordance with another aspect of the present invention, provided is a thermoplastic resin, including a graft copolymer formed by graft-polymerizing a) a conjugated diene rubber with b) at least one selected from the group consisting of an aromatic vinyl compound, a vinyl cyan compound, and an acrylate-based compound; and a polymeric antimicrobial agent having a primary, secondary, tertiary, or quaternary amine group.

In accordance with another aspect of the present invention, provided is a method of preparing a thermoplastic resin composition, the method including: i) a step of preparing a graft copolymer latex by graft-polymerizing a) a conjugated diene rubber with b) at least one selected from the group consisting of an aromatic vinyl compound, a vinyl cyan compound, and an acrylate-based compound; ii) a step of performing coagulation by adding a polymeric antimicrobial agent having a primary, secondary, tertiary, or quaternary amine group to the graft copolymer latex; iii) a step of obtaining a thermoplastic resin from the coagulated graft copolymer; and iv) a step of melt-kneading 20 to 80% by weight of the thermoplastic resin (A) with 20 to 80% by weight of a copolymer resin (B) formed by polymerizing at least one selected from the group consisting of an aromatic vinyl compound, a vinyl cyan compound, and an acrylate-based compound.

In accordance with yet another aspect of the present invention, provided is a thermoplastic resin composition, including: 20 to 80% by weight of the thermoplastic resin (A), and 20 to 80% by weight of a copolymer resin (B) formed by polymerizing at least one selected from the group consisting of an aromatic vinyl compound, a vinyl cyan compound, and an acrylate-based compound.

Advantageous Effects

As apparent from the fore-going, the present invention advantageously provides a thermoplastic resin having superior antibiosis and melt-kneadability prepared through preparation of a graft copolymer latex and coagulation of the graft copolymer latex with a specific antimicrobial agent, and a method of preparing the thermoplastic resin to prepare a thermoplastic resin composition including the thermoplastic resin.

Best Mode

Now, the present invention will be described in more detail.

The present inventors continuously performed research into a method of uniformly dispersing a polymeric antimicrobial agent in a thermoplastic resin to prevent deterioration of mechanical properties. As a result, the present inventors confirmed that, when a graft copolymer latex is coagulated using a polymeric antimicrobial agent having a primary, secondary, tertiary, or quaternary amine group, a thermoplastic resin having superior antibiosis and melt-kneadability can be prepared and a thermoplastic resin composition having excellent mechanical properties, fluidity, and antibiosis can be prepared by using the thermoplastic resin, thus completing the present invention.

Hereinafter, the method of preparing a thermoplastic resin according to the present invention will be described in detail.

The method of preparing a thermoplastic resin includes i) a step of preparing a graft copolymer latex by graft-polymerizing a) a conjugated diene rubber with b) at least one selected from the group consisting of an aromatic vinyl compound, a vinyl cyan compound, and an acrylate-based compound; and ii) a step of performing coagulation by adding a polymeric antimicrobial agent having a primary, secondary, tertiary, or quaternary amine group to the graft copolymer latex.

The graft-polymerizing of step (i) may be, for example, emulsion polymerization. The emulsion polymerization may be performed by, for example, a batch-type, semi-batch, or continuous process. During the emulsion polymerization of the graft copolymer, each ingredient may be added, for example, batchwise or according to a graft addition method wherein all or a portion of the ingredient is continuously added.

An emulsifier used in the emulsion polymerization of the graft copolymer of step (i) is not specifically limited and may be particularly at least one selected from the group consisting of alkylaryl sulfonate; alkalimethylalkyl sulfate; sulfonated alkylester; and general adsorbent emulsifiers such as a soap of fatty acid and an alkali salt of rosin acid.

In step (ii), the polymeric antimicrobial agent having the amine group may be used as coagulant.

The coagulation of step (ii) may be performed at, for example, pH 2 to 6. Within this range, heat stability of a resin decreases due to a remaining acidic material does not occur. In addition, binding of the polymeric antimicrobial agent is easily performed, thus exhibiting superior antibacterial characteristics.

In another embodiment, the polymeric antimicrobial agent of step (ii) may be dissolved in an amount of 0.1 to 10% by weight, 0.1 to 5% by weight, or 0.5 to 3% by weight in an aqueous acidic solution having a pH of 2 to 5. Within this pH range, superior coagulation characteristics are provided and the polymer has superior stability during long storage without decomposition of the polymer due to an acid. In addition, when the polymeric antimicrobial agent is dissolved in a range of 0.1 to 10% by weight in an aqueous acidic solution, superior coagulation characteristics are provided and non-coagulation does not occur. In addition, the aqueous acidic solution has a viscosity suitable for the coagulation process.

The aqueous acidic solution having a pH of 2 to 5 may be an aqueous acidic solution including, for example, an organic acid or an inorganic acid. Particularly, the aqueous acidic solution may be at least one selected from the group consisting of acetic acid, formic acid, citric acid, butyric acid, palmitic acid, oxalic acid, sulfuric acid, hydrochloric acid, phosphoric acid, nitric acid, and boric acid.

Specific examples of the coagulation of step (ii), which is not specifically limited, include a batch-type coagulate method of adding a coagulant and then adding a latex, a continuous coagulation method of continuously adding a coagulant and a latex, a mechanical coagulation method of coagulating through mechanical shearing, and a slow coagulate method.

The a) conjugated diene rubber may be added in an amount of, for example, 20 to 70% by weight, 30 to 60% by weight, or 35 to 50% by weight based on the graft copolymer. Within this range, superior impact strength is provided and grafting is completely performed during polymerization, thereby having excellent mechanical properties.

The conjugated diene rubber may be, for example, a polymer of a conjugated diene compound such as a butadiene polymer, a styrene-butadiene copolymer (SBR), acrylonitrile-butadiene copolymer (NBR), ethylene-propylene diene copolymer (EPDM), or a polymer derived therefrom.

The conjugated diene rubber latex may have an average particle diameter, for example, 800 to 6,000 Å, or 1,500 to 4,500 Å, or 2,000 to 4,000 Å. Within this average particle diameter, the conjugated diene rubber latex has superior impact strength.

In another embodiment, a gel content of the conjugated diene rubber latex may be 60 to 95%, or 65 to 90%. Within this range, superior impact strength is provided.

In another embodiment, the conjugated diene rubber latex may have a swelling index of 12 to 40, or 15 to 30. Within this range, superior impact strength is provided.

The at least one selected from the group consisting of an aromatic vinyl compound, a vinyl cyan compound, and an acrylate-based compound may be added in an amount of, for example, 30 to 80% by weight, 40 to 70% by weight, or 50 to 75% by weight based on the graft copolymer. Within this range, superior mechanical properties and property balance are provided.

The aromatic vinyl compound may be added in an amount of 5 to 60% by weight, 15 to 55% by weight, or 30 to 50% by weight based on the graft copolymer. Within this range, superior processability and property balance are provided.

The aromatic vinyl compound may be at least one selected from the group consisting of, for example, styrene, α-methyl styrene, o-ethyl styrene, p-ethyl styrene, and vinyltoluene.

The vinyl cyan compound may be added in an amount of, for example, 0 to 20% by weight or 10 to 20% by weight based on the graft copolymer. Within this range, a coagulum is not generated during graft-polymerizing, whereby productivity increases and the resin composition maintains natural color thereof without yellowing.

The vinyl cyan compound may be at least one selected from the group consisting of, for example, acrylonitrile, methacrylonitrile, and ethacrylonitrile.

The acrylate-based compound may be added in an amount of, for example, 0 to 60% by weight or 0 to 40% by weight based on the graft copolymer. Within this range, superior processability and property balance are provided.

The acrylate-based compound may be, for example, a (meth)acrylic acid alkylester compound. Particularly, the acrylate-based compound may be at least one selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

The polymeric antimicrobial agent having the amine group may be added in an amount of, for example, 1 to 20 parts by weight, 1 to 10 parts by weight, or 3 to 8 parts by weight, based on 100 parts by weight of the graft copolymer. Within this range, excellent antibacterial and coagulation characteristics and superior impact strength are provided.

50% or more of monomers, preferably main monomers, more preferably monomers that constitute a main chain, constituting the polymeric antimicrobial agent having the amine group includes a primary, secondary, tertiary, or quaternary amine group.

The polymeric antimicrobial agent having the amine group may have solubility to an aqueous acidic solution having a pH of, for example, 1 to 5, and insolubility to an aqueous acidic solution having a pH of, for example, 6 to 12. For example, the solubility is a property wherein 0.1 g or more of a solute dissolves in 100 g of a solvent at 23° C. under atmospheric pressure, whereas the insolubility is a property wherein 0.1 g or more of a solute does not dissolve under the same condition.

In another embodiment, 1 g or more of the polymeric antimicrobial agent having the amine group may be dissolved in 100 g of an aqueous acidic solution having a pH of 1 to 5 at 23° C. under atmospheric pressure.

The polymeric antimicrobial agent having the amine group is not specifically limited so long as it satisfies solubility to the pH and has the constituents. Particularly, the polymeric antimicrobial agent may be at least one selected from the group consisting of poly(diallyldimethyl ammonium chloride, polydicyandiamide, polyethyleneimine, chitosan, modified chitosan, and polyvinylpyridine. In another embodiment, the polymeric antimicrobial agent is poly(N-vinylpyrrolidone).

The thermoplastic resin according to the present invention includes a thermoplastic resin, including a graft copolymer formed by graft-polymerizing a) a conjugated diene rubber with b) at least one selected from the group consisting of an aromatic vinyl compound, a vinyl cyan compound, and an acrylate-based compound; and a polymeric antimicrobial agent having a primary, secondary, tertiary, or quaternary amine group.

A method of preparing the thermoplastic resin according to the present invention composition includes i) a step of preparing a graft copolymer latex by graft-polymerizing a) a conjugated diene rubber with b) at least one selected from the group consisting of an aromatic vinyl compound, a vinyl cyan compound, and an acrylate-based compound; ii) a step of performing coagulation by adding a polymeric antimicrobial agent having a primary, secondary, tertiary, or quaternary amine group to the graft copolymer latex; iii) a step of obtaining a thermoplastic resin from the coagulated graft copolymer; and iv) a step of melt-kneading 20 to 80% by weight of the thermoplastic resin (A) with 20 to 80% by weight of a copolymer resin (B) formed by polymerizing at least one selected from the group consisting of an aromatic vinyl compound, a vinyl cyan compound, and an acrylate-based compound.

A method of polymerizing the copolymer resin formed by polymerizing the (B) at least one selected from the group consisting of an aromatic vinyl compound, a vinyl cyan compound, and an acrylate-based compound, which is not specifically limited, may be particularly suspension polymerization, mass polymerization, or continuous mass polymerization.

The copolymer resin B may be, for example, prepared through a continuous process in which a raw material feeding pump, a continuous stirring bath, a preliminary heating bath, a volatilization bath, a copolymer transfer pump and an extruder are used.

The thermoplastic resin A and the copolymer resin B may be kneaded by means of a kneader such as, for example, a banbury mixer, a single screw extruder, or a twin screw extruder, a buss kneader.

The aromatic vinyl compound included in the copolymer resin B may be at least one selected from the group consisting of, for example, styrene, α-methyl styrene, o-ethyl styrene, p-ethyl styrene, and vinyltoluene. The aromatic vinyl compound may be included in an amount of 10 to 90% by weight, or 30 to 80% by weight, or 50 to 80% by weight based on the copolymer resin B.

The vinyl cyan compound included in the copolymer resin B may be at least one selected from the group consisting of, for example, acrylonitrile, methacrylonitrile, and ethacrylonitrile. The vinyl cyan compound may be included in an amount of 10 to 70% by weight, or 20 to 60% by weight, or 20 to 40% by weight based on the copolymer resin B.

The acrylate-based compound included in the copolymer resin B may be at least one selected from the group consisting of, for example, (meth)acrylic acid methyl ester, (meth)acrylic acid ethyl ester, (meth)acrylic acid propyl ester, (meth)acrylic acid 2ethylhexylester, (meth)acrylic acid decyl ester, and (meth)acrylic acid lauryl ester. The acrylate-based compound may be included in an amount of 0 to 20% by weight or 0 to 10% by weight, based on the copolymer resin B.

The thermoplastic resin according to the present invention composition includes 20 to 80% by weight of the thermoplastic resin and 20 to 80% by weight of a copolymer resin (B) formed by polymerizing at least one selected from the group consisting of an aromatic vinyl compound, a vinyl cyan compound, and an acrylate-based compound.

The content of a conjugated diene rubber in the thermoplastic resin composition may be, for example, 5 to 35% by weight, 5 to 25% by weight, or 10 to 20% by weight. When the conjugated diene rubber is included within this range, superior impact strength, increased processability, and superior rigidity are provided.

In another embodiment, the thermoplastic resin composition may include 60 to 95% by weight, 75 to 95% by weight, or 80 to 90% by weight of a monomer mixture including at least one selected from the group consisting of an aromatic vinyl compound, a vinyl cyan compound, and an acrylate-based compound. Within this range, superior property balance is provided.

The thermoplastic resin composition may have an impact strength, for example, 10 kg·cm/cm or more, 15 kg·cm/cm or more, or 20 kg·cm/cm or more.

In another embodiment, the thermoplastic resin composition may have a fluidity of 13 g/10 min (220° C., 10 kg) or more, or 15 g/10 min (220° C., 10 kg) or more.

The thermoplastic resin composition may randomly include an additive such as a heat stabilizer, a photostabilizer, an antioxidant, an anti-static agent, an antimicrobial agent, or a lubricant, within a range within which properties thereof are not affected.

In addition, the present invention provides a molded article made of the thermoplastic resin composition. The molded article may be, for example, an office machine, an electrical and electronic product, an automobile interior material, a toy, or a miscellaneous good.

Now, the present invention will be described in more detail with reference to the following examples. These examples are provided only for illustration of the present invention and should not be construed as limiting the scope and spirit of the present invention.

EXAMPLES

Example 1

A) Preparation of Graft Copolymer 40 parts by weight (based on a solid) of a butadiene rubber latex (gel content: 80%, average particle diameter: 0.3 μm) prepared through emulsion polymerization with 120 parts by weight of deionized water, 0.5 parts by weight of rosin acid potassium, 5.0 parts by weight of acrylonitrile, 10 parts by weight of styrene, and 0.1 part by weight of tertiary dodecyl mercaptan were fed batchwise into a polymerization reactor filled with a nitrogen atmosphere and reaction temperature was elevated to 50° C. When an interior temperature of the reactor reached 50° C., 0.1 parts by weight of tert-butyl hydroperoxide, 0.1 parts by weight of dextrose, 0.1 parts by weight of sodium pyrophosphate, and 0.002 parts by weight of ferrous sulfate were added to the reactor batchwise to initiate polymerization. Subsequently, reaction temperature was elevated to 70° C. over 30 minutes. Subsequently, 12.6 parts by weight of acrylonitrile, 32.4 parts by weight of styrene, 25 parts by weight of deionized water and 1.0 part by weight of rosin acid potassium were mixed. This resultant monomer emulsion solution was continuously fed into the reactor over two hours. At the same time, 0.15 parts by weight of tert-butyl hydroperoxide also was continuously fed into the reactor over two hours. When feeding of the monomer emulsion solution was terminated, 0.05 parts by weight of tert-butyl hydroperoxide, 0.05 parts by weight of dextrose, 0.05 parts by weight of sodium pyrophosphate, 0.001 parts by weight of ferrous sulfate were fed into the reactor batchwise. Subsequently, reaction temperature was elevated to 80° C. over 30 minutes and aging was performed for 30 minutes, followed by terminating the reaction. As a result, an ABS graft copolymer latex was prepared.

Coagulation and Aging 5 parts by weight (based on chitosan solid) of an aqueous chitosan solution, as a coagulant, prepared by dissolving 2% by weight of chitosan in 2% by weight of an aqueous sulfuric acid solution, as a polymeric antimicrobial agent, was added to the prepared ABS graft copolymer latex, and coagulation was performed at 70° C. During the coagulation, pH was 3.5. After the coagulation, aging was carried out at 90° C., and dehydration and drying were carried out. As a result, an ABS graft copolymer powder was obtained. Here, a generated filtrate was analyzed through liquid chromatography. As a result, chitosan was not detected.

B) Preparation of Copolymer (SAN) Resin

A raw material prepared by mixing 25 parts by weight of acrylonitrile and 75 parts by weight of styrene with 30 parts by weight of toluene, as a solvent, and 0.15 parts by weight of di-tert-dodecylmercaptan, as a molecular weight controller was continuously added to a polymerization reactor filled with a nitrogen atmosphere, and reaction temperature was maintained at 148° C. An average reaction time was three hours. A polymerized solution discharged from the reactor was heated in a preliminary heating bath, and unreacted monomers were vaporized in a volatilization bath. The temperature of a copolymer was maintained at 210° C. and a copolymer resin was prepared into a pellet type by means of a copolymer transfer pump and an extruder.

C) Preparation of Thermoplastic Resin Composition (Melt-Kneading a with B)

40 parts by weight of the obtained ABS graft copolymer powder (A) and 60 parts by weight of the copolymer (SAN) resin (B) were mixed in a general mixer, and 1.0 part by weight of a lubricant and 0.2 parts by weight of an antioxidant were added to the mixer. Melting and kneading were carried out at 200° C. by means of a twin screw extruder, thereby preparing a pellet-type resin composition. The prepared pellet-type resin composition was injected and prepared into a specimen for measuring properties.

Example 2

An experiment was carried out in the same manner as in Example 1, except that, in the coagulation and aging processes, 5 parts by weight of an aqueous poly(diallyldimethyl ammonium chloride) solution (based on poly(diallyldimethyl ammonium chloride) solid) prepared by dissolving 2% by weight of poly(diallyldimethyl ammonium chloride) in 2% by weight of an aqueous sulfuric acid solution, as a polymeric antimicrobial agent, were used instead of the aqueous chitosan solution at 5 parts by weight (based on chitosan solid). A filtrate generated in the coagulation and aging processes was analyzed through liquid chromatography. As a result, poly(diallyldimethyl ammonium chloride) was not detected.

Example 3

An experiment was carried out in the same manner as in Example 1, except that, in the coagulation and aging processes, 5 parts by weight of an aqueous poly(N-vinylpyrrolidone) solution (based on poly(N-vinylpyrrolidone) solid) prepared by dissolving 2% by weight of poly(N-vinylpyrrolidone) in 2% by weight of an aqueous sulfuric acid solution, as a polymeric antimicrobial agent, was used instead of the aqueous chitosan solution at 5 parts by weight (based on solid). A filtrate generated in the coagulation and aging processes was analyzed through liquid chromatography. As a result, poly(N-vinylpyrrolidone) was not detected.

Example 4

An experiment was carried out in the same manner as in Example 1, except that, the coagulation and aging processes, 10 parts by weight of an aqueous chitosan solution (based on chitosan solid) was used. A filtrate generated in the coagulation and aging processes was analyzed through liquid chromatography. As a result, chitosan was not detected.

Example 5

An experiment was carried out in the same manner as in Example 1, except that, in the coagulation and aging processes, 2 parts by weight of an aqueous chitosan solution (based on chitosan solid) were used. A filtrate generated in the coagulation and aging processes was analyzed through liquid chromatography. As a result, chitosan was not detected.

Comparative Example 1

An experiment was carried out in the same manner as in Example 1, except that, in the coagulation and aging processes, a 5 wt % aqueous sulfuric acid solution, as a polymeric antimicrobial agent, was used in an amount of 1.8 parts by weight instead of the aqueous chitosan solution at 5 parts by weight (based on chitosan solid).

Comparative Example 2

An experiment was carried out in the same manner as in Example 1, except that, in the coagulation and aging processes, an aqueous chitosan solution was used in an amount of 1 part by weight (based on chitosan solid).

Comparative Example 3

An experiment was carried out in the same manner as in Comparative Example 1, except that, in the melting and kneading (A) and (B), 20 parts by weight of a dried chitosan powder were additionally added with a lubricant and an antioxidant, as additives.

Test Example

Properties of thermoplastic resin composition specimens prepared according to Examples 1 to 5 and Comparative Examples 1 to 3 were measured according to the following methods. Results are summarized in Table 1 below.

Measurement Methods

Antibiosis: Using the specimens, staphylococcus reduction rates after incubation for 24 hours at 35° C. were measured according to KICM-FIR-1003, as an antimicrobial activity test method.

Impact strength (Notched Izod, kg·cm/cm): Measured according to ASTM D256, as a standard measurement method, using ¼" specimens.

Melt index (g/10 min): Measured according to ASTM D1238 (220° C., 10 kg), as a standard measurement method, using specimens.

Gel content and swelling index: Butadiene rubber latex was coagulated using a dilute acid or a metallic salt and then washed. The washed latex was dried in a 60° C. vacuum oven for 24 hours. Obtained rubber mass was thinly cut with scissors. 1 g of rubber fragments was added to 100 g of toluene and stored in a room-temperature dark room for 48 hours, followed by being separated into a sol and a gel. The sol and gel were respectively dried. A gel content was calculated according to [Mathematical Equation 1] below and a swelling index was calculated according to [Mathematical Equation 2] below.

[Mathematical Equation 1]
$$\text{GEL CONTENT (\% BY WEIGHT)} = \frac{\text{WEIGHT OF INSOLUBLE SUBSTANCE (GEL)}}{\text{WEIGHT OF SAMPLE}} \times 100$$

[Mathematical Equation 2]
$$\text{SWELLING INDEX} = \frac{\text{WEIGHT OF SWELL POLYMER GEL}}{\text{WEIGHT OF DRIED POLYMER GEL}}$$

Average particle diameter: Measured by means of 370 HPL manufactured Nicomp, US according to a dynamic laser light scattering method.

TABLE 1

| Classification | Examples | | | | | Comparative Examples | | |
|---|---|---|---|---|---|---|---|---|
|  | 1 | 2 | 3 | 4 | 5 | 1 | 2 | 3 |
| Impact strength (kg · cm/cm) | 33.0 | 32.7 | 29.2 | 28.0 | 33.0 | 32.0 | 32.5 | 7.1 |
| Melt index (g/10 min) | 23 | 20 | 22 | 19 | 22 | 24 | 23 | 12 |
| Antibiosis | ◎ | ◎ | ◎ | ◎ | ○ | X | X | ○ |

* Antibiosis: Classified into three steps based on bacteria reduction rate (◎ - very good, ○ - good, X - bad).

As shown in Table 1, it can be confirmed that in Examples 1 to 5 in which chitosan, as a polymeric antimicrobial agent having an amine group, poly(diallyldimethyl ammonium chloride), and poly(N-vinylpyrrolidone) are used as coagulants according to the present invention, excellent mechanical properties such as impact strength of 10 kg·cm/cm or more and excellent fluidity such as melt index of 13 g/10 min or more are exhibited, the thermoplastic resins included in the compositions thereof exhibit superior melt-kneadability, and excellent antibiosis are exhibited.

On the other hand, it can be confirmed that, in Comparative Example 1 in which a polymeric antimicrobial agent having an amine group is not added in the coagulation and aging processes and Comparative Example 2 in which the chitosan having an amine group, a polymeric antimicrobial agent, is added in an amount of 1 part by weight, very poor antibiosis is exhibited and, in Comparative Example 3 in which a polymeric antimicrobial agent having an amine group is added in an amount of 20 parts by weight during the melt-kneading, antibiosis is exhibited, but impact strength and melt index are very poor.

In conclusion, the method of preparing the thermoplastic resin of the present invention provides thermoplastic resin having superior antibiosis and melt-kneadability by coagulating the graft copolymer latex using the polymeric antimicrobial agent having the primary, secondary, tertiary, or quaternary amine group. Accordingly, it can be confirmed that a thermoplastic resin having superior antibiosis and melt-kneadability is provided through the present invention and a thermoplastic resin composition including the thermoplastic resin exhibits excellent mechanical properties, fluidity, and antibiosis.

The invention claimed is:

1. A method of preparing a thermoplastic resin, the method comprising:
   i) preparing a graft copolymer latex by graft-polymerizing a) a conjugated diene rubber with b) at least one selected from the group consisting of an aromatic vinyl compound, a vinyl cyan compound, and an acrylate-based compound; and
   ii) performing coagulation by adding 1) a polymeric antimicrobial agent having a primary, secondary, tertiary, or quaternary amine group, or 2) poly(N-vinylpyrrolidone), to the graft copolymer latex,
   wherein the antimicrobial agent polymer of ii) is added as a dissolved solution of 0.1 to 10% by weight in an aqueous acidic solution having a pH of 2 to 5.

2. The method according to claim 1, wherein the coagulation of ii) is carried out in a solution having a pH of 2 to 6.

3. The method according to claim 1, wherein the polymeric antimicrobial agent having the amine group or the poly(N-vinylpyrrolidone) is added in an amount of greater than 1 parts by weight and less than 20 parts by weight based on 100 parts by weight of the graft copolymer.

4. The method according to claim 1, wherein 50% or more of monomers constituting the polymeric antimicrobial agent having the amine group are monomers containing a primary, secondary, tertiary, or quaternary amine group.

5. The method according to claim 1, wherein the polymeric antimicrobial agent having the amine group is at least one selected from the group consisting of poly(diallyldimethyl ammonium chloride), polydicyandiamide, polyethyleneimine, chitosan, modified chitosan, and polyvinylpyridine.

6. The method according to claim 1, wherein 1 g or more of the polymeric antimicrobial agent having the amine group or the poly(N-vinylpyrrolidone) is dissolved at 23° C. based on 100 g of an aqueous acidic solution having a pH of 1 to 5.

7. The method according to claim 1, wherein the a) conjugated diene rubber is added in an amount of 20 to 70% by weight, and the b) at least one selected from the group consisting of an aromatic vinyl compound, a vinyl cyan compound, and an acrylate-based compound is added in an amount of 30 to 80% by weight.

8. The method according to claim 1, wherein the acrylate-based compound is at least one selected from the group consisting of (meth)acrylic acid methyl ester, (meth)acrylic acid ethyl ester, (meth)acrylic acid propyl ester, (meth)acrylic acid 2-ethylhexyl ester, and (meth)acrylic acid decyl ester.

9. The method according to claim 1, wherein the aromatic vinyl compound is at least one selected from the group consisting of styrene, α-methyl styrene, o-ethyl styrene, p-ethyl styrene, and vinyltoluene.

10. The method according to claim 1, wherein the vinyl cyan compound is at least one selected from the group consisting of acrylonitrile, methacrylonitrile, and ethacrylonitrile.

11. A method of preparing a thermoplastic resin composition, the method comprising:
   i) preparing a graft copolymer latex by graft-polymerizing a) a conjugated diene rubber with b) at least one selected from the group consisting of an aromatic vinyl compound, a vinyl cyan compound, and an acrylate-based compound;
   ii) performing coagulation by adding a polymeric antimicrobial agent having 1) a primary, secondary, tertiary, or quaternary amine group, or 2) poly(N-vinylpyrrolidone), to the graft copolymer latex;
   iii) obtaining a thermoplastic resin from the coagulated graft copolymer; and
   iv) melt-kneading 20 to 80% by weight of the thermoplastic resin (A) with 20 to 80% by weight of a copolymer resin (B) formed by polymerizing at least one selected from the group consisting of an aromatic vinyl compound, a vinyl cyan compound, and an acrylate-based compound,
   wherein the antimicrobial agent polymer of ii) is added as a dissolved solution of 0.1 to 10% by weight in an aqueous acidic solution having a pH of 2 to 5.

* * * * *